Dec. 30, 1924.

A. T. STUART

FILTER SCREEN

Filed Nov. 9, 1921

1,520,781

Inventor.
Alexander T. Stuart
by H. J. S. Dennison atty.

Patented Dec. 30, 1924.

1,520,781

UNITED STATES PATENT OFFICE.

ALEXANDER T. STUART, OF TORONTO, ONTARIO, CANADA.

FILTER SCREEN.

Application filed November 9, 1921. Serial No. 513,932.

*To all whom it may concern:*

Be it known that I, ALEXANDER T. STUART, a subject of the King of Great Britain, and resident of the city of Toronto, county of York, Province of Ontario, in the Dominion of Canada, have invented certain new and useful Improvements in Filter Screens, described in the following specification and illustrated in the accompanying drawings, that form part of the same.

The objects of this invention are, to simplify the construction of the means for supporting the filter fabric, thereby cheapening its cost and rendering it more serviceable and more easily handled.

The principal feature of the invention consists in the novel manner of spacing the thin strips of rigid material arranged between and supporting the screen fabrics, whereby spacing members are arranged longitudinally of the strips intermediate of their width.

In the drawings, Figure 1 is an elevational view of a filter frame showing the filter fabric partly broken away.

It has been previously proposed to construct a filter screen with an arrangement of a plurality of extremely thin strips of a rigid material to support the filter fabric, the strips being spaced apart a considerably greater width than their thickness but such spaces being so narrow as to give adequate support to a filtering fabric of the lightest texture but providing a filter area of much greater magnitude than has been previously attained.

Figure 1:
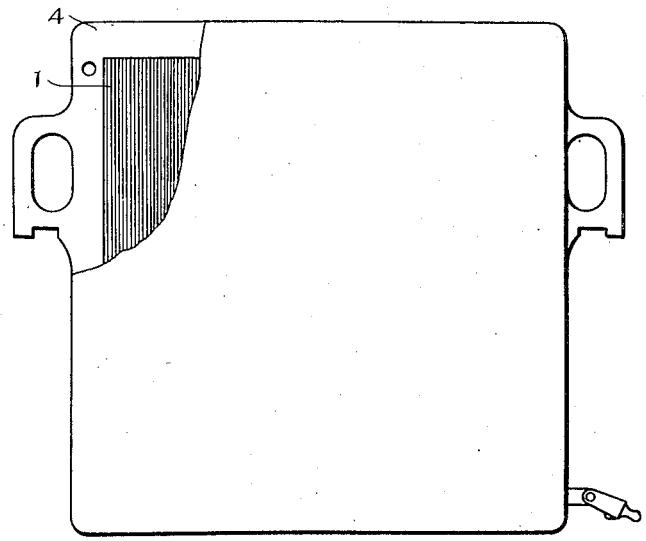
Figure 2:
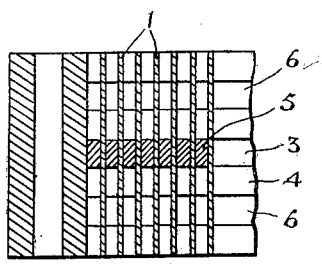
Figure 2 is an enlarged cross sectional view through a portion of one of the screen sections.
Figure 3:
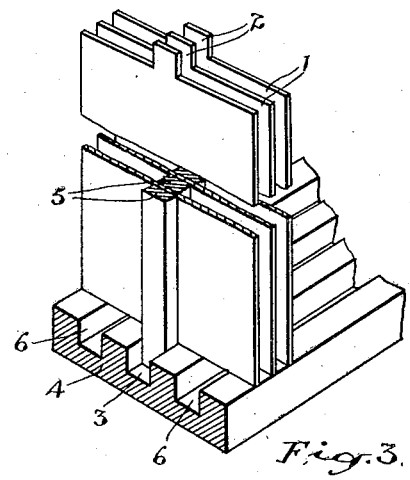
Figure 3 is an enlarged sectional perspective view taken transversely through the bottom of the frame showing the method of holding the screen supports and spacing members.

The present invention has to do with the spacing of these extremely thin strips of rigid material and in the form shown in Figure 2 the structure consists of a plurality of very thin blades 1 which are preferably formed with the lugs 2 arranged central of their width and projecting from the ends. These lugs extend into the slot 3 in the bottom and top bars of the filter frames 4.

The blades 1 are spaced apart the desired distance by narrow strips 5 which are of substantially the same width as the lugs 2 and fit into the slots 3. These strips are of a thickness several times that of the blades 1 and separate said blades uniformly throughout the width of the frame. The blades thus provide a uniform support for the filtering fabric.

It will be understood that a construction such as described enables a very rapid assembly as the blades and supporting strips are simply placed in position in the frame in alternating arrangement and are held securely by the end lugs on the blades engaging the slots 3 and by the strips 5 fitting into said slots. The fluids filtering into the spaces between the blades 1 are carried away by suitable ducts 6 in the bottom part of the frame.

Figure 4:
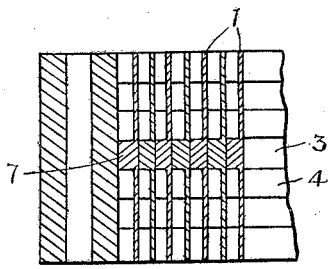
Figures 4 and 5 are enlarged cross sectional views of modified structures.

In the modification shown in Figure 4 the blades are shown formed with a centre rib 7 which performs the same function as the strips 5 but is an integral part with the blade and requires the handling of but one kind of blade member. The blades are cut with the central rib projecting from the ends so as to fit into the slots 3 of the frame.

Figure 5:
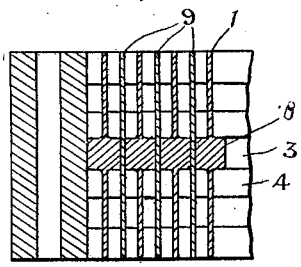

In the form shown in Figure 5 the construction differs slightly from that shown in Figure 4 in that the central rib 8 projects from both sides of the blade instead of being arranged all on one side and in this modification the central rib is integral with the blade. Plain blades 9 are preferably inserted alternately between the rib 8.

With a construction such as described the extremely thin material of the blades is retained perfectly straight throughout its entire length by reason of the central strips 5 engaging them for their entire length and the supporting body for the filtering fabric is a thoroughly rigid structure, forming the maximum support to the filtering medium while presenting an extraordinarily large filtering area.

What I claim as my invention is:—

1. In a filter press, the combination with an open frame and filter screens, of a plurality of blades of thin material extending from face to face of the frame to support the filter screens, means extending longitudinally of said supports and spacing them apart from end to end, and ducts in said frame for receiving the filtered material.

2. In a filter press, the combination with an open frame having grooves in the interior walls, a plurality of blades of extremely thin rigid material arranged in said frame, supports for said blades extending from end to end thereof and projecting into said grooves and holding said blades separated, and ducts arranged in said frame at either side of said supports for conducting the filtered fluid.

3. In a filter press, the combination with an open frame having slots arranged centrally of its width, of a plurality of narrow strips fitted into said slots, and supporting blades of much thinner material than said strips inserted therebetween and spaced thereby providing filtering spaces of considerably greater area than the area of the edges of the blades.

4. In a filter screen, the combination with a frame open at the sides and having slots extending longitudinally of the bottom, of a plurality of blades of thin sheet material arranged within the frame, supporting strips of narrower width and greater thickness than the blades arranged between and spacing said blades and located between said slots.

ALEXANDER T. STUART.